United States Patent
Kawakami et al.

(10) Patent No.: US 6,308,183 B1
(45) Date of Patent: Oct. 23, 2001

(54) FILE MANAGEMENT SYSTEM AND FILE MANAGEMENT METHOD CAPABLE OF MANAGING UNOCCUPIED BLOCKS WITHOUT THE USE OF DUMMY DATA

(75) Inventors: Yasunori Kawakami, Hyogo-ken; Hiroshi Taniyama, Osaka-fu, both of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/150,694

(22) Filed: Sep. 10, 1998

(30) Foreign Application Priority Data

Sep. 11, 1997 (JP) .................................................... 9-247019

(51) Int. Cl.7 .................................................... G06F 12/00
(52) U.S. Cl. ............................................ 707/205; 711/165
(58) Field of Search ............................. 707/205, 206, 707/200; 711/170, 203, 103, 113, 129, 143, 157, 158, 164, 154, 165, 166, 171, 213

(56) References Cited

U.S. PATENT DOCUMENTS

| | | | | |
|---|---|---|---|---|
| 5,333,305 | * | 7/1994 | Neufeld .................................... | 714/5 |
| 5,434,991 | * | 7/1995 | Maeda et al. ......................... | 711/112 |
| 5,542,066 | * | 7/1996 | Mattson et al. ....................... | 711/136 |
| 5,544,356 | * | 8/1996 | Robinson ............................. | 707/205 |
| 5,592,669 | * | 1/1997 | Robinson ............................. | 707/206 |
| 5,754,817 | * | 5/1998 | Wells .................................... | 711/203 |
| 5,768,298 | * | 6/1998 | Nagai et al. .......................... | 714/769 |
| 5,781,733 | * | 7/1998 | Stiles .................................... | 711/113 |
| 5,974,581 | * | 10/1999 | Nagai et al. .......................... | 714/755 |
| 5,983,387 | * | 11/1999 | Nagai et al. .......................... | 714/775 |
| 6,041,393 | * | 3/2000 | Hsu ...................................... | 711/157 |
| 6,076,184 | * | 6/2000 | Nagai et al. .......................... | 714/775 |
| 6,182,088 | * | 1/2001 | Kaawkami et al. .................. | 707/205 |

OTHER PUBLICATIONS

"The Design and Implementation of the 4.3BSD UNIX Operating System", by Samuel J. Leffler, et al., ISBN 0–201–06196–1, May 1989; Addison–Wesley Publishing Co.

* cited by examiner

Primary Examiner—Hosain T. Alam
(74) Attorney, Agent, or Firm—McDermott, Will & Emery (57) ABSTRACT

The present invention relates to a method to handle dummy blocks without real data in a file management system. More specifically, block allocation means 30 is provided with a function of counting the number of dummy blocks without real data when there is a request to write new data at a file offset address one or more blocks away from the last file offset On in a specific file, and the unoccupied block management means 40 is additionally given a function of managing the number of unoccupied blocks subtracting the number of dummy blocks from the number of unoccupied blocks. That always leaves the number of unoccupied blocks with the number of the necessary blocks subtracted therefrom. The blocks necessary for later writing can be secured.

18 Claims, 12 Drawing Sheets

| Block number | File identifier |
|---|---|
| Bn | fn |
| Bn+1 | fn |
| ⋮ | ⋮ |

Block table: Tb              Identifier field: Fi

| Offset | Block |
|---|---|
| O1 | B1 |
| O2 | B2 |
| O3 | B3 |
| O4 | B4 |
| ⋮ | ⋮ |
| Oi | Bi |
| | Bd1 |
| | Bd2 |
| | Bd3 |
| | ⋮ |
| | Bdh |
| Oj | Bj |
| Oj+1 | Bj+1 |
| ⋮ | ⋮ |
| Om | Bk |

O1–Oi: Block number: Bn (top section)

Bd1–Bdh: Dummy block number: Bd

Block section without real data: Az

File offset: On

| Fi |
|---|
| 0 |
| 0 |
| 0 |
| 0 |
| ⋮ |
| 0 |
| 1 |
| 1 |
| 1 |
| ⋮ |
| 1 |
| 0 |
| 0 |
| |
| 0 |

Block identifier: Ib

1: Dummy block
0: Real block

FILE MANAGEMENT SYSTEM AND FILE MANAGEMENT METHOD CAPABLE OF MANAGING UNOCCUPIED BLOCKS WITHOUT THE USE OF DUMMY DATA

FIELD OF THE INVENTION

The present invention relates to a file management system using a storage device and a method of managing the file system.

BACKGROUND OF THE INVENTION

Figure 11:
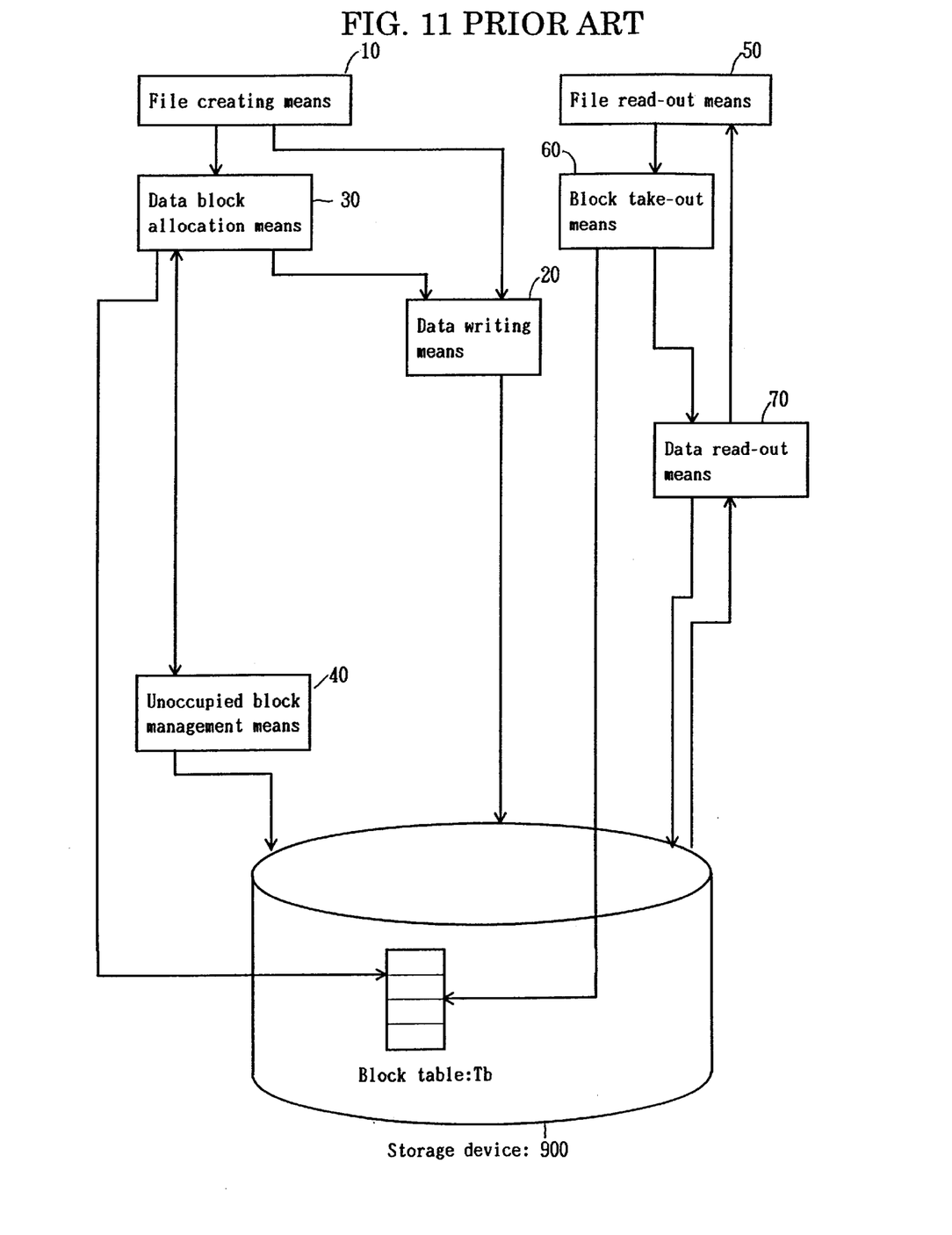
FIG. 11 is a block diagram showing the prior art file management system.

The prior art file management system is outlined in a block diagram in FIG. 11.

The prior art file system as illustrated in FIG. 11 is so configured that the storage area in the storage device 900 is divided into data blocks of a certain size, 8 kilobytes, for example, each data block given a block number and its occupation status managed by an unoccupied block management means 40. The blocks already allocated for a specific file are registered on a block table which is stored in the storage device 900, and are used for writing or reading out data as described below.

Figure 12:
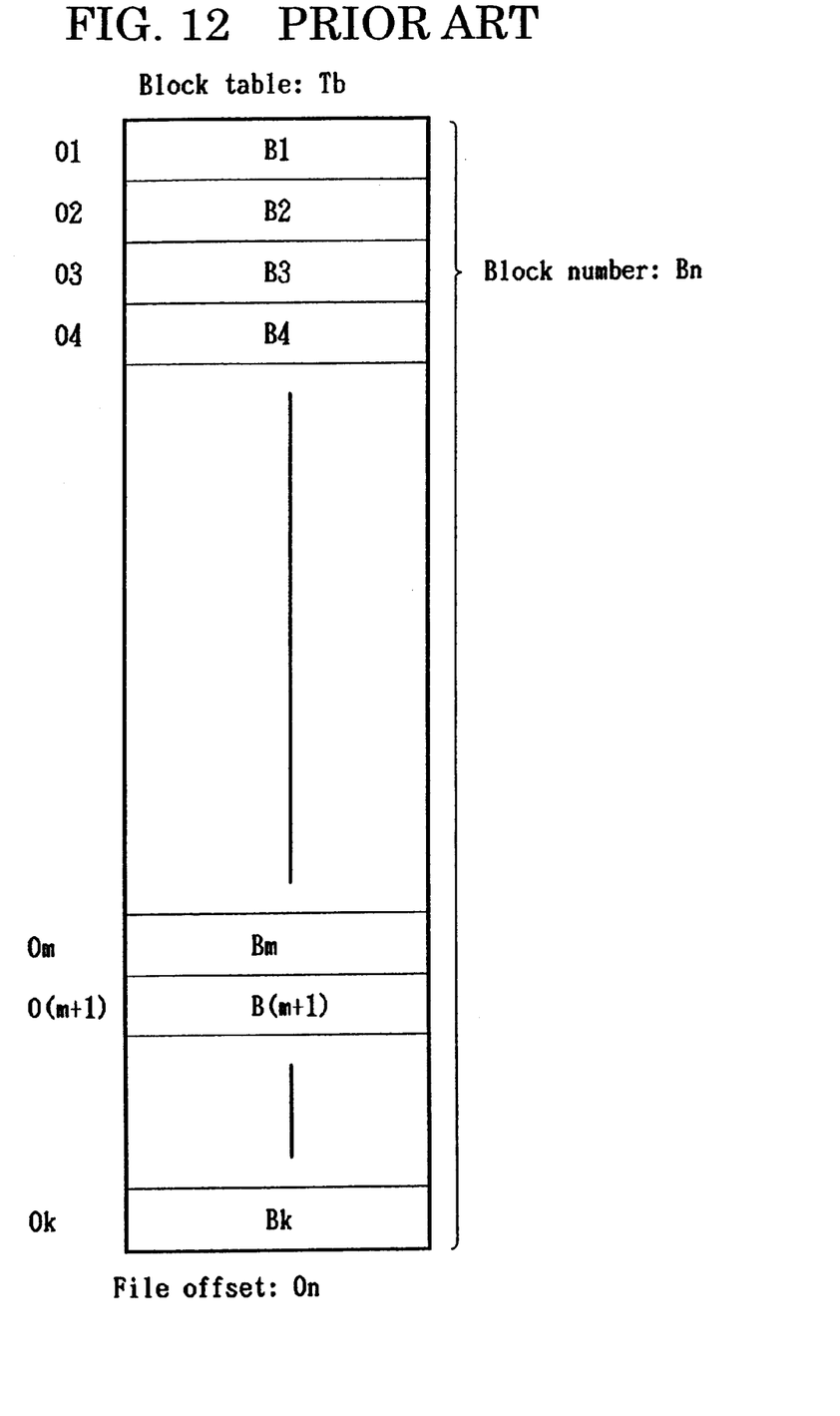
FIG. 12 is a conceptional diagram showing the block table of the prior art.

FIG. 12 is a conceptional diagram showing the configuration of the block table Tb in the aforesaid prior art file management system. On the block table Tb, the block number Bn (B1, B2, B3, B4, . . . Bk) is registered in order of the corresponding file offset 0n.

It should be understood that for purpose of this specification, file offset is a measure of quantity of data or data size from the head of the file The suffix On corresponds to the code number given to each data fragment when data is fragmented by the specific size (one block size, for example), and can indicate the position or address in a file. It also indicates the data size at a specific offset address. File offset 04, for example, means four times the data size of offset 01.

When a new file is to be created, a file creating means 10 directs a data block allocation means 30 to acquire block numbers for the new file, indicating the file offset 0n, and gives data to write to a data writing means 20 at the same time.

The data block allocation means 30 first reads out the block table Tb stored on the storage device 900 and checks to see whether the area (data block) corresponding to the indicated file offset 0n is already allocated for the file to write or not.

In case a data block is already allocated in the area corresponding to the indicatecd file offset 0n, that is, a block number Bn is registered, then the said block number bn is taken out. If no data block is allocated yet, the unoccupied block management means 40 is ordered to search for a new data block.

The said unoccupied block management means 40, which manages the occupation status of the respective data blocks and the current number of unoccupied blocks in the whole file management system as mentioned above, notifies the data block allocation means 30 of the block number Bn read out by the an unoccupied block management means 40.

The data block allocation means 30 registers on the block table Tb the received block number Bn in such a way that the block number is paired with the file offset 0n acquired from the file creating means 10 and stores this block table Tb on the storage device 900. The data block allocation means 30 informs the data writing means 20 of the acquired block number Bn at the same time. The data writing means 20 then writes data into the space at the received block number Bn on the storage device 900.

When data in a specific file is to be read out at the request from outside in this system (in practice, the request is made by specifying or inputting subheading from outside when the requirement of a subheading from the top is provided, and the file read-out means acquires an offset 0n on the basis of the inputted data), the file read-out means 50 notifies a block take-out means 60 of the file offset 0n. The block take-out means 60 in turn reads out the block table Tb stored on the storage device 900 and acquires from the block table Tb the block number Bn corresponding to the given file offset 0n, and informs the data read-out means 70 of the block number.

Receiving the block number Bn, the data read-out means 70 reads out the object data from the space at that block number Bn On the storage device 900 and forwards the same to the file read-out means 50.

Figure 3:
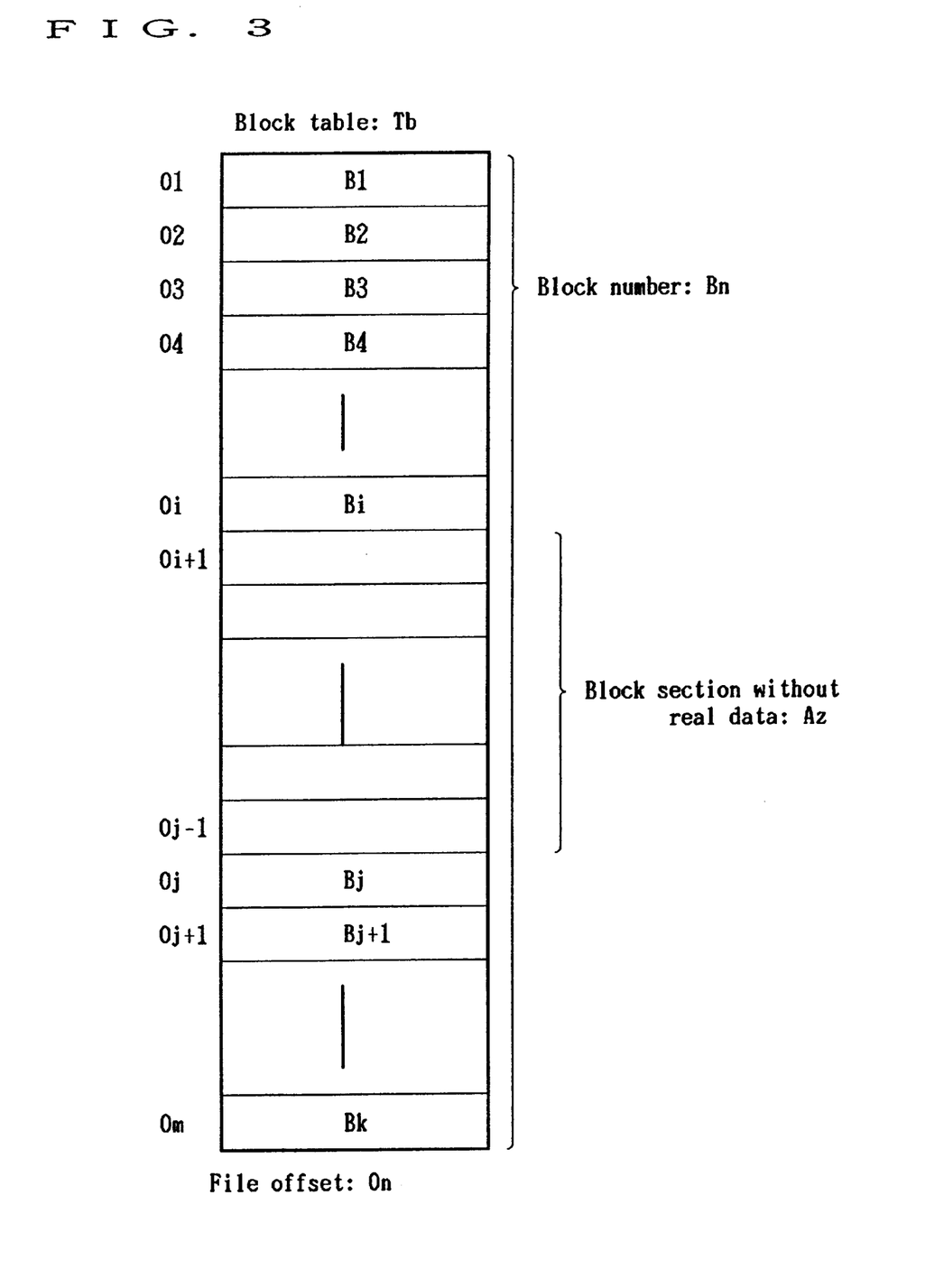
FIG. 3 is a conceptional diagram showing the makeup of a block table in the first embodiment according to the present invention.

If the point specified as starting file offset address for writing a new data is one or more data block size down from the end point of last file offset, there occurs a block region Az without real data or dummy blocks on the block table Tb as shown in FIG. 3.

Figure 13:
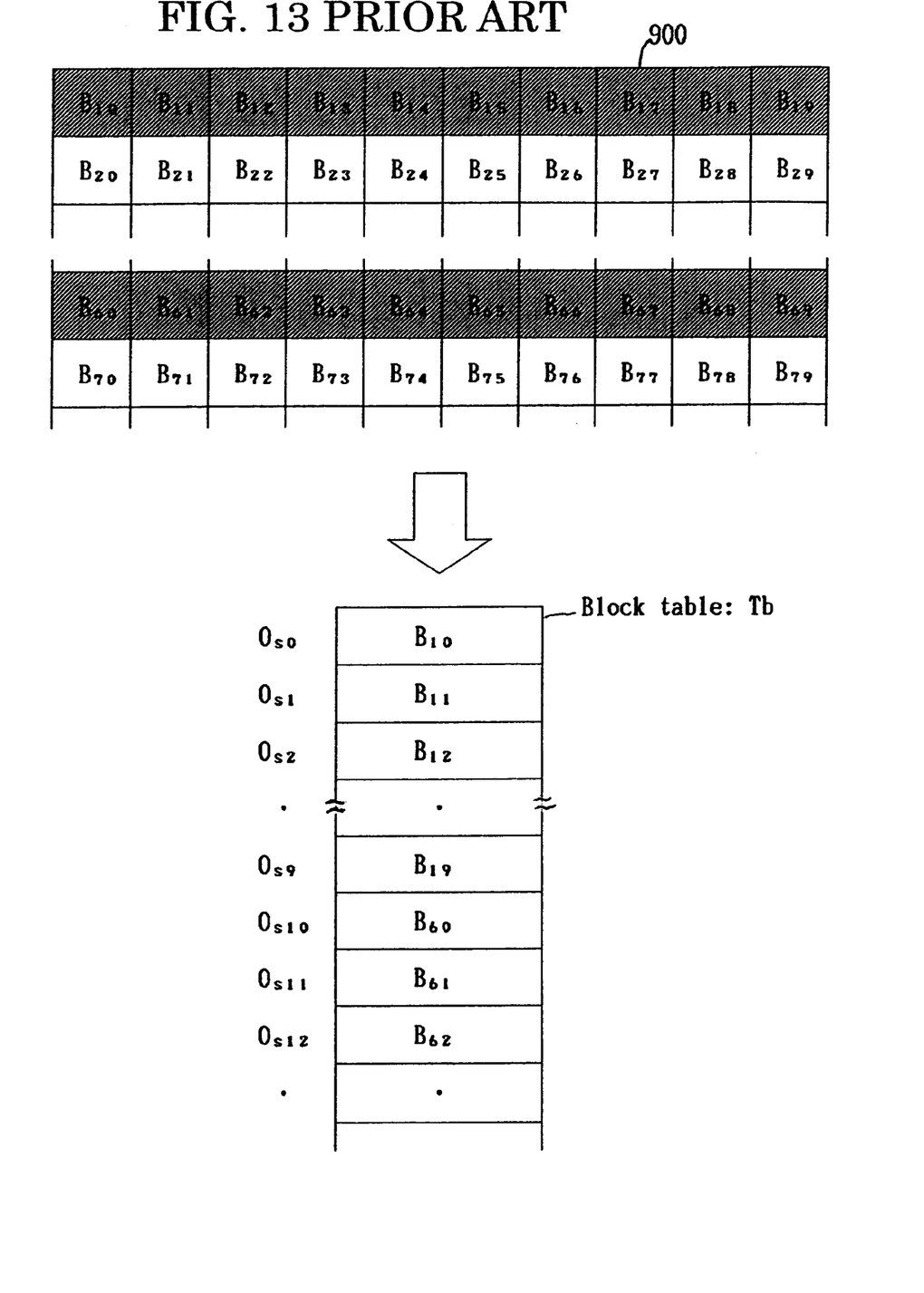
FIG. 13 is an explanatory diagram of the prior art.

In the usual file management, even if continuous data are written in data blocks which are apart from each other, each block is arranged consecutively on the block table Tb. As shown in FIG. 13, for example, data on 0s0~0s9 were written in block B10 to block B19. When another continuous data on offset 0s10 downward are going to be written in blocks on B20 downward, it is found that somehow the blocks from B20 to B29 had already been occupied by other data, so that, the new data are written in vacant blocks from B60 downward instead. Even in such a case, the block table Tb stores both data up to offset 0s9 and data from offset 0s10 downward as one consecutive or continuous data as shown in FIG. 13(b).

It is to be understood that the block region (dummy blocks) without real data which is described here is so purposely created that other data may be written later as shown in FIG. 3.

There are two methods to protect the block region without real data, one in which data blocks are allocated in that block region without fail and the other in which no data blocks are allocated.

In the prior art file management system in which data blocks are allocated without fail in the block region without real data, arrangements are made this way: dummy data, 0 (or 1)-cleared data, for example, is written in the allocated data blocks without real data so that no indetified data may come out from the block region without real data in the read-out step.

In the prior art file management system which allocates no data blocks in the block region without real data, the block take-out means 60 checks the corresponding space in the block table Tb to find, on reading out from the block region without real data, that no data block is allocated yet, and informs the data read-out means 70 that no data block is present. Then, the data read-out means 70 prepares and forwards dummy data to the file read-out means 50. And when real data is written later in the block region without real data, a step to allocate data blocks is executed anew.

In the prior art file management system which allocates data block without fail in the block region without real data, there will take place simultaneously allocation of blocks and writing dummy data in the block region without real data if a file offset address not consecutive but apart from the end point of last file is specified for writing a new data.

As it often happens that real data is written later in the block region without real data, it is a waste of time to write dummy data.

In the prior art file management system which allocates no data blocks in the block region without real data, data blocks should be allocated in the block region without real data when real data is written later in that block region.

Since, however, no data blocks are allocated in the block region without real data, a data in some other file initially written occupies the block region. There is no assurance that the unoccupied blocks are left to be allocated for the intended writing of data. Thus it may fail to write real data in the unoccupied block.

The present invention is to resolve such problems with the prior art file management system as described above. And it is an object of the present invention to provide a file management system and a method of managing the same in which in writing data, no dummy data is written in the block region without real data but it will be ensured that in case real data is written later in the block region without real data, data blocks are available which can be allocated in the block region without real data.

SUMMARY OF THE INVENTION

To achieve the foregoing object, the present invention adopts the means described below. That is to say, the file system that forms the basis of the present invention is so configured that:

The storage area on the storage device 90 is divided into a specific size of data blocks; those data blocks are registered with a block table Tb in such a way that the numbers of the said data blocks are matched with the offset 0n written on the data blocks; unoccupied blocks are managed by the unoccupied block management means 40, and when there are issued instructions to write, the data block allocation means 30 refering to the block table Tb makes the procedure for writing.

On the said file management system, the present invention is built. That is to say, the aforesaid block allocation means 30 is provided with a function of counting the number of dummy blocks without real data when there is a request to write new data at a file offset address one or more blocks away from the last file offset 0n in a specific file, and the unoccupied block management means 40 is additionally given a function of managing the number of unoccupied blocks subtracting the number of dummy blocks from the number of unoccupied blocks.

That always leaves the number of unoccupied blocks with the number of the necessary blocks subtracted therefrom. The blocks necessary for later writing can be secured as described below:

A dummy block management means 110 is additionally provided which picks out from the unoccupied block management means 40 the block numbers of dummy blocks in the number calculated by the aforesaid data block allocation means 30 and manages those block numbers. And when there is a request to write in a dummy block region having at least one dummy block, the dummy block allocation means 120 will allocate the dummy blocks kept by the aforesaid dummy block management means 110 for the data to write.

That makes it possible to use the aforesaid dummy block as necessary.

The same effect also can be achieved by additionally providing a dummy block registration means 330. In this configuration, the block numbers of dummy blocks in the number calculated by the aforesaid data block allocation means 30 are picked out from the unoccupied block management means 40. Then the block numbers of those dummy blocks are registered on the spaces at file offset addresses corresponding to the dummy blocks on the block table. Additionally, a block identifier lb is provided which indicates that no real data is present in those blocks.

PREFERRED EMBODIMENTS OF THE INVENTION

EMBODIMENT 1

Figure 1:
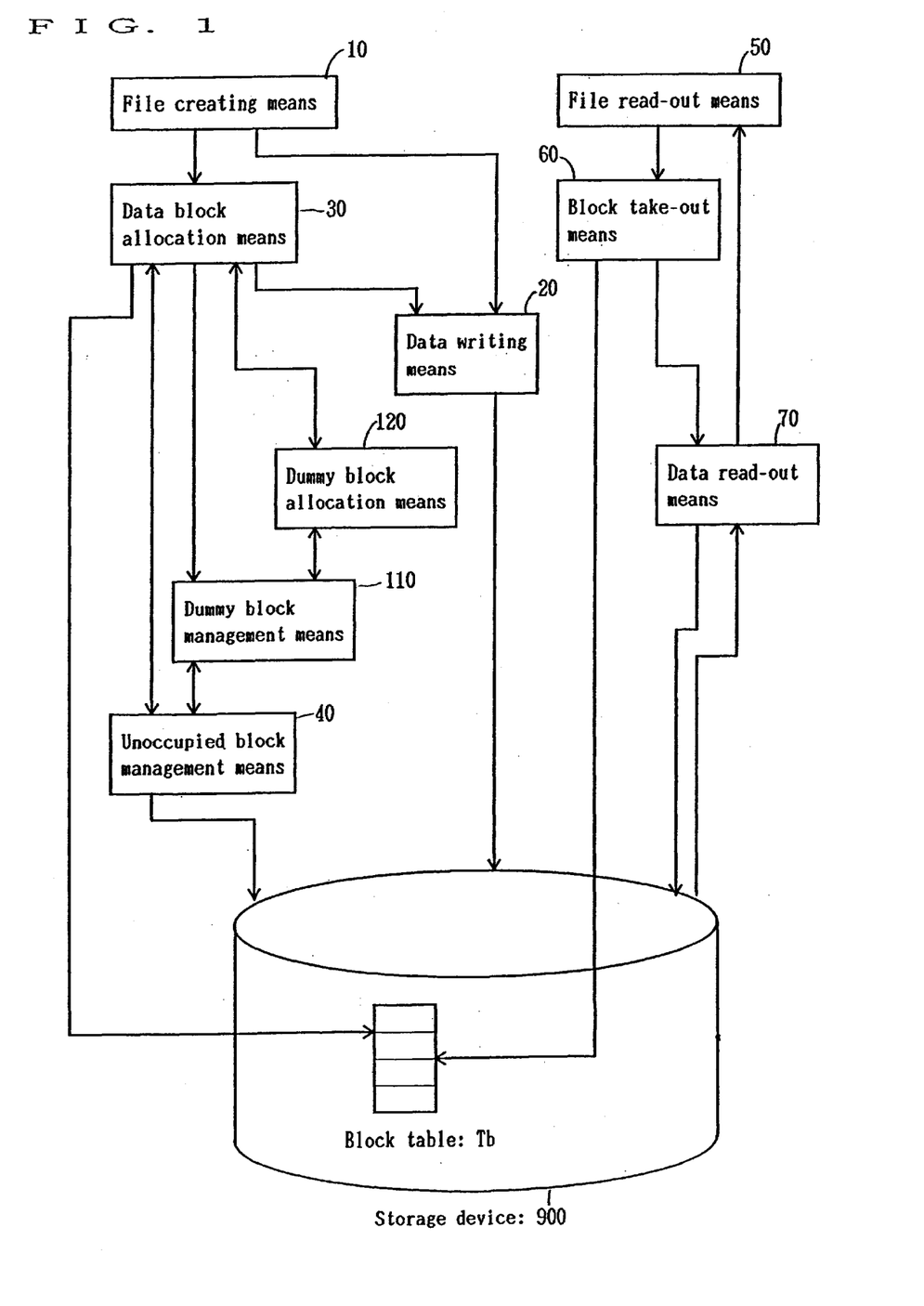
FIG. 1 is a block diagram showing the file management system of the first embodiment according to the present invention.
Figure 2:
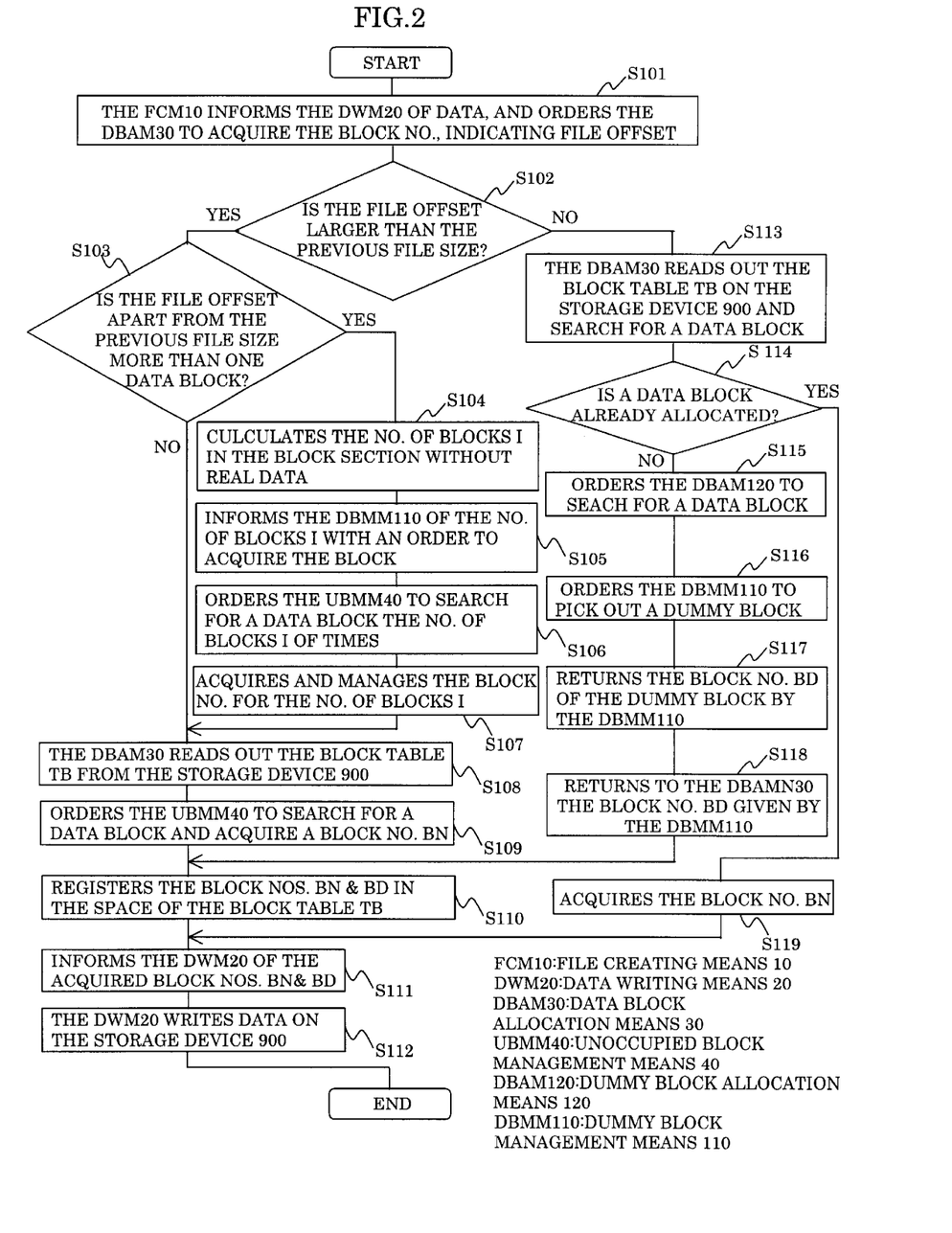
FIG. 2 is a flow diagram showing the procedure of writing data in the first embodiment according to the present invention.

The file management system of the first embodiment according to the present invention is illustrated in FIG. 1. And the flow diagram in FIG. 2 shows the procedure of writing data in the first embodiment. FIG. 3 is a conceptional diagram of an example of the block table used in the first embodiment. The configuration as well as the operation of the present embodiment will now be described hereinafter.

As in the prior art system, the storage area on the storage device 900 is divided into a certain size of data blocks, 8 kilobytes, for example, each data block is given a block number, its occupation status is registered with a table (not shown) and the unoccupied blocks are managed by an unoccupied block management means 40. Another feature is that when data blocks are allocated for a specific file in the procedure described below, a block table Tb as shown in FIG. 3 is formed.

At a demand for writing from outside, a user terminal, for example, the file creating means 10 notifies the data writing means 20 of the data to write in the file and gives the file offset to the data block allocation means 30, and orders to acquire the block number of the data block on the storage device 900 (FIG. 2, Step S101).

Ordered to acquire a block number, the data block allocation means 30 first checks whether the file offset 0n up for the data to write is larger than the previous file size or not (FIG. 2, Step S102). If the aforesaid file offset 0n is smaller than the previous file size, the block table Tb stored on the storage device 900 is read out, and the space corresponding to the file offset 0n is searched (FIG. 2, Step S113).

If another data block is already allocated in the space searched, the block number Bn is taken out, followed by the writing step (FIG. 2, Step S114: Yes→S119). In case no data block is allocated yet, a dummy block which is managed by the dummy block allocation means 120 as described below will be acquired, which will be described later.

In case the file offset 0n up for the data to write is found to be larger than the previous file size in the aforesaid file size checking step (Step S102), the data block allocation means 30 will further check to see if the file offset for the data to write is one or more data blocks apart from the previous file size (FIG. 2, Step S103).

If the difference is not one data block or more than that, that is, a blank of one or more data blocks is not created, the data block allocation means 30 reads out the block table Tb from the storage device and at the same time orders the unoccupied block management means 40 to search for a data block. Receiving the order, the unoccupied block management means 40 picks out an unoccupied data block on the storage device, informing the data block allocation means 30 of the block number Bn (FIG. 2, Steps S108→S109).

Informed of the block number Bn, the data block allocation means 30 registers the block number Bn in the space on the block table Tb read in from the storage device 900 corresponding to the file offset 0n received from the file creating means 10 and stores the block table Tb on the storage device 900 (FIG. 2, Step S110).

The data block allocation means 30 gives the acquired block number Bn to the data writing means 20. The data writing means 20 in turn writes the file data received from the file creating means 10 in the space at the received block number Bn on the storage device 900 (FIG. 2, Step S111→S112).

If in the aforesaid step of checking for block-size difference (FIG. 2, Step S103) a file offset 0n is indicated one or more data blocks apart from the last in the previous file, there will come out a block region without real data or dummy block region on the block table Tb as FIG. 3 (FIG. 2, Step S103, Yes).

In FIG. 3, for example, the proposed writing is to begin at file offset 0j while the previous file ends at file offset 0i. If the difference in data size (0j −0i+1 block of data) is equivalent to or larger than one block of data, the blocks corresponding to the section between file offset 0i+1 and file offset 0j-1 constitutes a dummy block region.

Finding a dummy block region Az, the data block allocation means 30 calculates out the number of blocks required to fill in the dummy block region Az on the basis of the data size of the previous file and the file offset 0j for the new data to write, and informs the dummy block management means 110 of the number of blocks required, and orders the said dummy block management means 110 to acquire the blocks (FIG. 2, Steps S104→S105).

Ordered to acquire the blocks, the dummy block management means 110 instructs the unoccupied block management means 40 to search for a data block the number of times equivalent to the aforesaid number of blocks, gets the block numbers Bd (Bd1 to Bdh) for the necessary number of blocks and manages those block numbers (FIG. 2, Steps S106→S107). In the present embodiment, the acquired block numbers Bd (Bd1 −Bdh) in the dummy block region do not appear on the block table Tb, but could tentatively be represented as in FIG. 8.

Accordingly, the numbers of unoccupied blocks in the whole file management system managed by the unoccupied block management means 40 are reduced in degree of the numbers of blocks received by the dummy block management means 110. Even if, therefore, the unoccupied blocks in the whole file management system managed by the unoccupied block management means 40 are all allocated in writing data in another file, for example, the dummy blocks managed by the dummy block management means 110 will remain intact and can be used to fill in the aforesaid dummy block region without fail.

There will now be described a case where the file offset 0n in which data are to be written in answer to a request made to the file creating means 10 from outside corresponds to the blocks in the dummy block region, that is, real data is to be written in the blocks in the dummy block region secured as dummy blocks as shown above.

In that case, the file creating means 10 notifies the data block allocation means 30 of the file offset 0n, and the data block allocation means 30 reads out the block table Tb stored in the storage device 900 to find that the data blocks are not allocated in the space corresponding to the file offset 0n on the block table Tb. Namely, from the last offset address (0n=0m) of the file and the heading offset address 0n for the proposed writing (in FIG. 3, for example, 0n =0i+1, that is, 0m >0i+1), it will also be found that the real data is not written in the dummy block region. And it means that data blocks are not allocated yet (FIG. 2, Step S114: No).

Then, the data block allocation means 30 orders not the unoccupied block management means 40 but the dummy block allocation means 120 to search for the data blocks, giving the file offset 0n.

Having an order to search for the data blocks, the dummy block allocation means 120 orders the dummy block management means 110 to pick out the dummy blocks managed by the latter, receiving block number Bd of the picked out data blocks and notifying the same to the data block allocation means 30 (FIG. 2, Step S118→S115).

Receiving the block number Bd, the data block allocation means 30 registers the block number Bd on block table Tb and notifies the data writing means 20 of that numbers, followed by the data writing means 20 writing data in the usual steps of writing. (FIG. 2, Steps S110→S118).

The arrangement on the writing side has just been described. Now, the makeup and operation on the read-out side is explained as follows.

The file read-out means 50 informs the block take-out means 60 of the file offset 0n for the data specified for reading out from outside, a user terminal, for example. The block take-out means 60 then reads out the block table Tb stored on the storage device 900 and searches for the space matched with the given file offset 0n on the block table Tb.

A block number Bn is acquired and given to the data read-out means 70. Receiving the block number Bn, the data read-out means 70 reads out the object data from the space indicated by that block number Bn on the storage device 900 and forwards the same to the file read-out means 50. If search of the block table Tb by the block take-out means 60 shows that the data block is not allocated in the space matched with the file offset On, that is to say, the case is reading out in the dummy block region, then the block take-out means 60 informs the data read-out means 70 that no data blocks are allocated.

Informed that the data blocks to read out do not exist, the data read-out means 70 prepares dummy data having a specific data pattern and forwards this dummy data to the file read-out means 50 as if the data had been read out from the storage device 900.

As set forth above, the present embodiment is so configured that in case a dummy block region is created in writing data in the file, no data blocks are allocated in the dummy block region, which makes it possible to forward dummy data in the read-out step without writing unnecessary dummy data. In addition, since the data blocks which fill in the dummy block region are managed by the dummy block management means 110, allocation of data blocks can be ensured when the block region is filled in with real data.

EMBODIMENT 2

Figure 4:
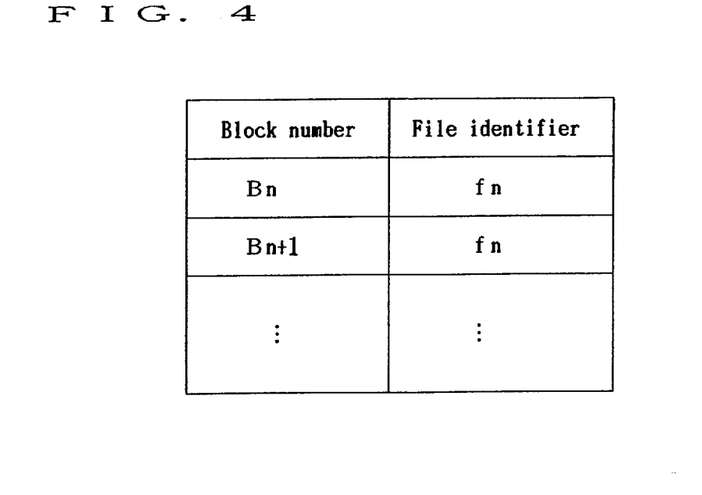
FIG. 4 is a conceptional diagram showing the dummy block management means in the second embodiment according to the present invention.

In the foregoing embodiment, the dummy block management means 110 is informed of only the number of blocks required to fill in the dummy block region in writing data. In another embodiment, it is so configured that the file creating means 10 informs the dummy block management means 110 through the data block allocation means 30 of a file identifier to identify the file now up for writing and that the dummy block management means 110 manages the dummy blocks by pairing the block numbers received from the unoccupied block management means 40 and the file identifiers as shown in FIG. 4.

And when real data is written in the blocks in the dummy block region, the file creating means 10 informs the dummy block allocation means 120 through the data block allocation means 30 of the file identifier to identify that file, while the dummy block allocation means 120 issues to the dummy block management means 110 an order to pick out dummy blocks managed by the latter, indicating the file identifier.

Figure 5:
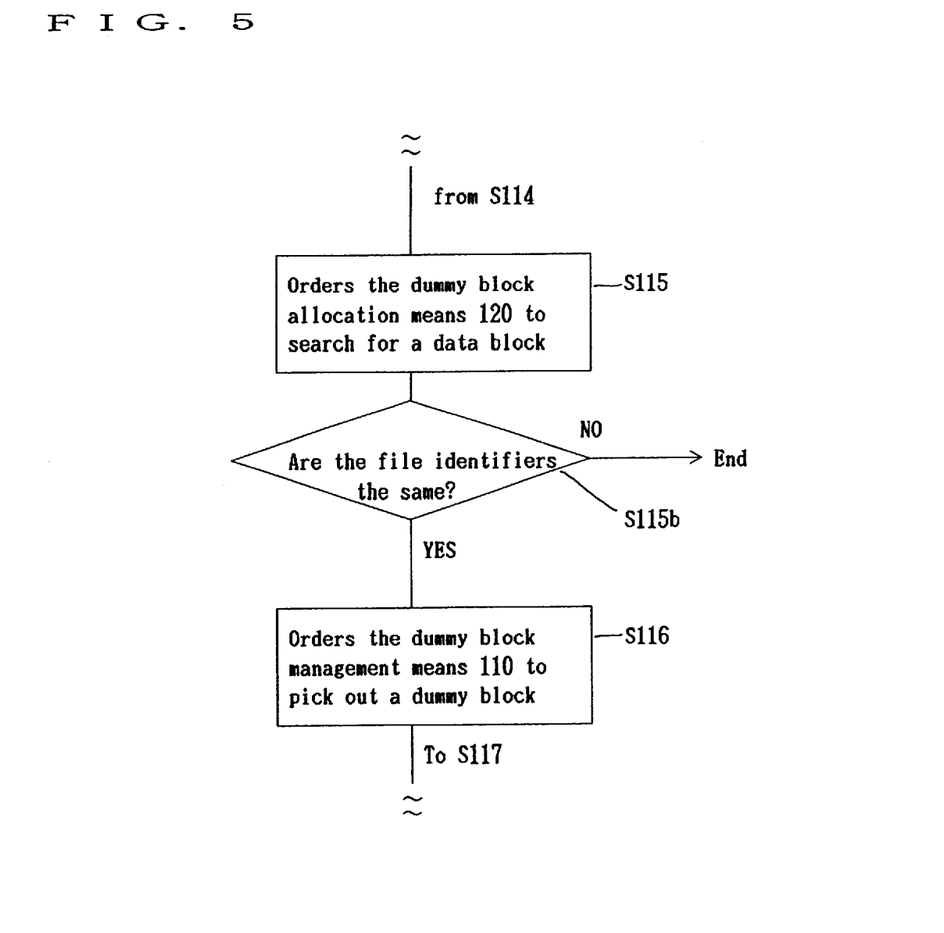
FIG. 5 is a flow diagram showing the procedure of writing data in the second embodiment according to the present invention.

Before picking out the dummy blocks, the dummy block management means 110 makes sure that the received file identifier is identical with that managed by itself, and decides on the data blocks to allocate (FIG. 5, Step S115b).

That ensures that when data is written in a file, the dummy blocks acquired by the dummy block management means 110 will be allocated for the file without fail. That can preclude the possibility of allocating the dummy blocks to a wrong file when the dummy blocks are intended for a specific file and earmarked with special features such as the setting and conditions in writing data in the file, for example.

EMBODIMENT 3

Figure 6:
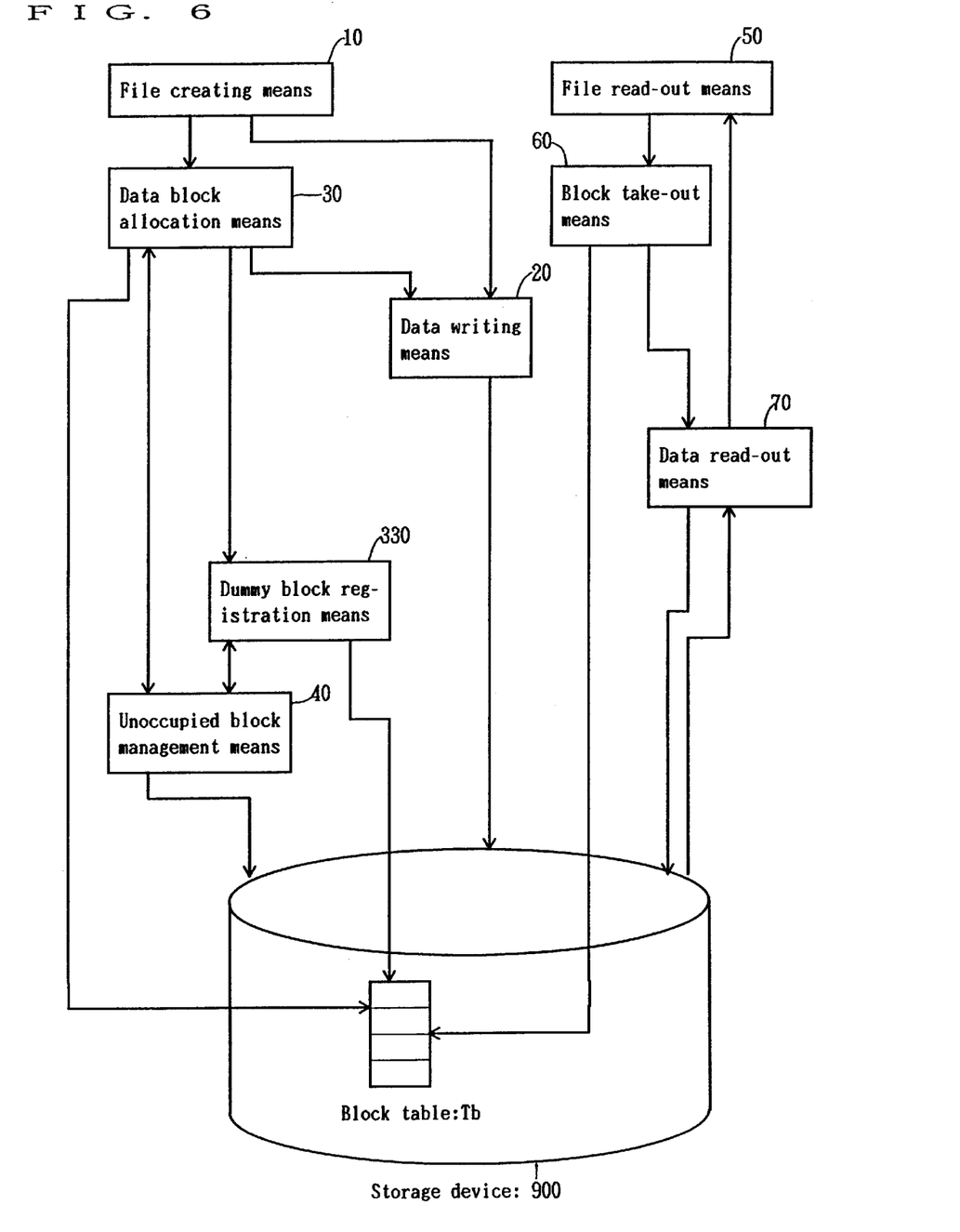
FIG. 6 is a block diagram showing the file management system of the third embodiment according to the present invention.
Figure 7:
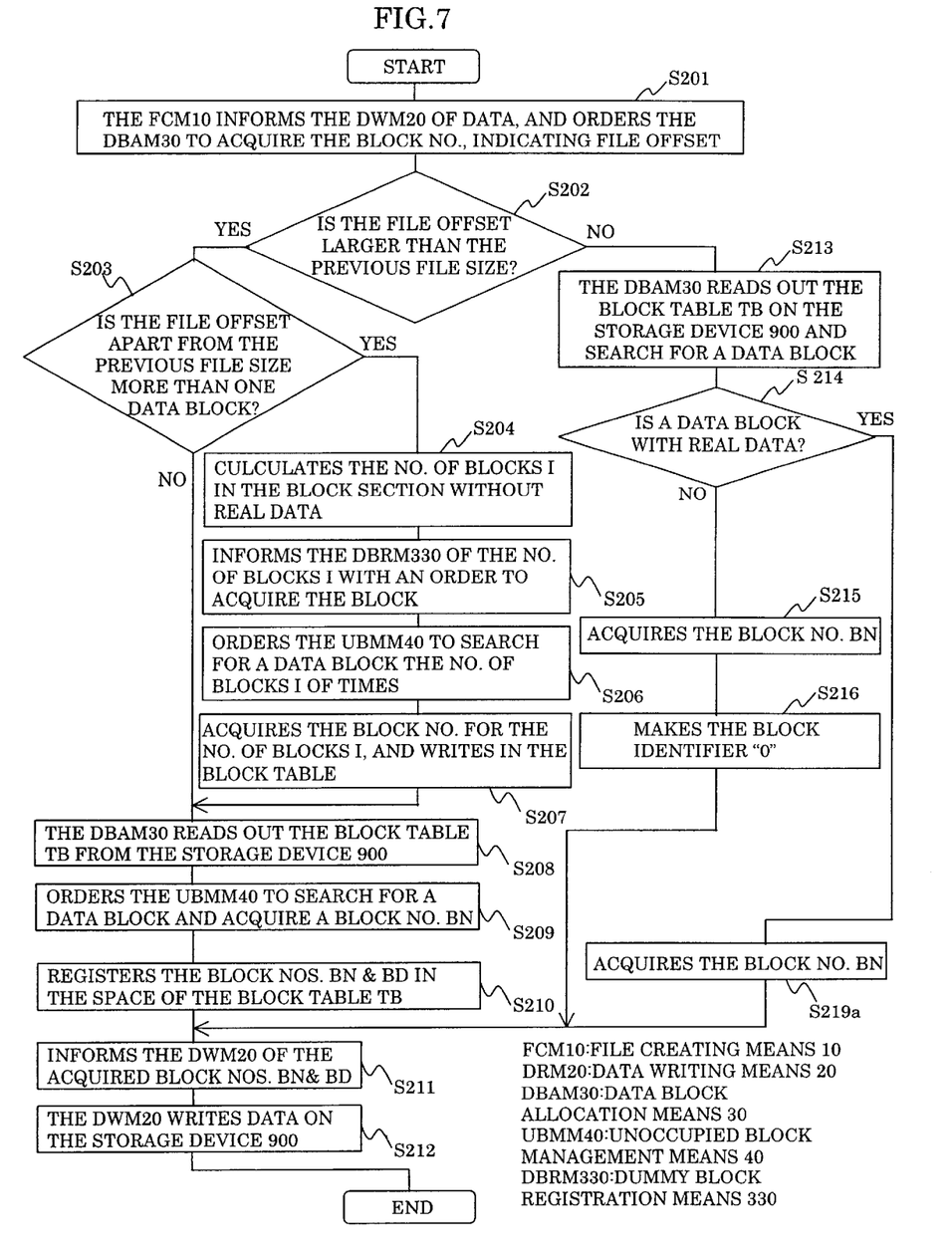
FIG. 7 is a flow diagram showing the procedure of writing data in the third embodiment according to the present invention.
Figure 8:
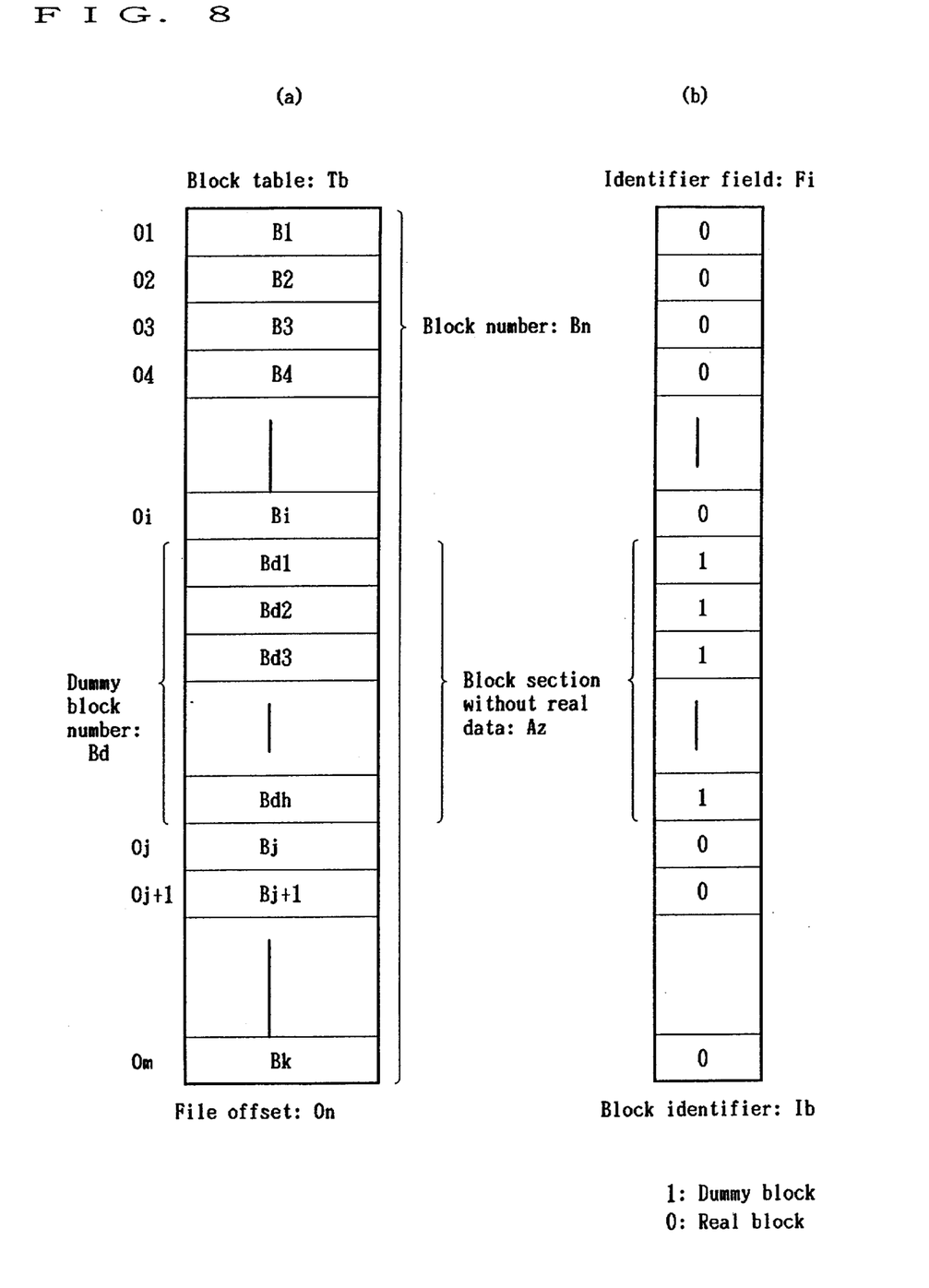
FIG. 8 is a conceptional diagram showing the block table having a block identifier in the third embodiment according to the present invention.

FIG. 6 is the block diagram showing the file management system in the third embodiment. FIG. 7 is the flow diagram showing the operational process of the third embodiment. Illustrated in FIG. 8 is a conceptional diagram showing examples of the block table and identifier used in the embodiment shown in FIG. 6. There will now be described the configuration and operation of the present embodiment.

Receiving a request-to-write from outside, a user terminal, for example, the file creating mean 10 informs the date writing means 20 of the data to write in the file and orders the data block allocation means 30 to acquire the block numbers of the data blocks on the storage device 900, indicating the offset number (FIG. 7, Step S201) as in Embodiment 1.

Ordered to acquire the block numbers, the data block allocation means 30 first judges whether the file offset On for the data to write is larger than the previous file size (FIG. 7, Step S 202). If the file offset On is smaller than the previous file size, then the block table Tb stored on the storage device 900 is read out and the space matched with the given file offset On is searched for (FIG. 7, Step S213).

In the present embodiment as described hereinafter, the specified space is already allocated for data blocks with real data or dummy blocks. Whether writing is in the dummy blocks or not is first judged, and the appropriate block number Bn is taken out, followed by writing (FIG. 7, Steps S214→S219a).

In case the foregoing step of judging the file size (Step S202) indicates that the data file offset up for the writing is lager than the previous file size, the data block allocation means 30 further checks to see if the file offset for writing is apart by one or more data block from the previous file size (FIG. 7, Step S203).

In case the file offset is not apart by one or more data blocks in the foregoing file size comparison step, the same procedure as shown in FIG. 1 is followed: reading of the block table Tb (FIG. 7, Step S208), acquisition of block numbers by the unoccupied block management means 40 (FIG. 7, Step S209), registration of the newly acquired block numbers in the proper space of the block table Tb (FIG. 7, Step S210) and writing (FIG. 7, Steps S211→S212).

If the file offset up for writing is found to be apart from the previous file size by one or more data blocks in the foregoing file size comparison step (FIG. 7, Step S203), that is, a dummy block region is created, the following steps are followed (FIG. 7, Step S203: Yes):

Detecting the dummy block region, the data block allocation means 30 calculates the number of blocks required to fill in the dummy block region on the basis of the data size at the end point of the previous file and that at the start of the new file offset On, and informs the dummy block registration means 330 of the number of blocks, giving an order to acquire the blocks (FIG. 7, Steps S204→S205).

Ordered to acquire the blocks, the dummy block registration means 330 directs the unoccupied block management means 40 to search for a data block as many times as the aforesaid number of blocks indicated. Receiving the required number of blocks, the dummy block registration means 40 registers the block numbers (Bd=Bd1 to Bdh) starting with the space matched with the offset (On =0i+1) on the block table Tb in the storage device 900. The dummy block registration means 330 additionally provides an identifier field Fi to register a block identifier lb showing that those blocks are dummy blocks, and stores the same along with the block table Tb on the storage device 900 (FIG. 7, Steps S206→S207) as shown in FIG. 8(b). In the subsequent steps, the writing of data follows as in the foregoing embodiments.

In case the need arises to write real data in blocks in the dummy block region, the file creating means 10 informs the data block allocation means 30 of the file offset On. In reading out the block table Tb stored on the storage device 900, the data block allocation means 30 reads out the identifier in the space corresponding to the file offset On on the block table Tb. The said blocks is found out to be dummy blocks, and the data block allocation means 30 knows that the writing is that of real data in a dummy block region (FIG. 7, Step S214: No).

Since the block numbers of data blocks are registered (as dummy blocks) in the spaces corresponding to the file offset On on the block table Tb, the data block allocation means 30 can acquire the said block numbers. So, the data block allocation means 30 orders the identifiers corresponding to the file offset On so as to indicate that the corresponding blocks change from dummy ones to real ones with real data and stores the same on the storage device 900. In the subsequent steps, the writing of data follows as in the usual writing (FIG. 7, Steps S219b→S220).

Now, there will be described the makeup and operation on the reading side.

The file read-out means 50 informs the block take-out means 60 of the file offset On for the data specified for read-out from outside, a user terminal, for example. The block take-out means 60 then reads out both the block table Tb stored on the storage device 900 and also the block identifier lb in the identifier field Fi as shown in FIG. 8(b), and judges if the blocks corresponding to the given file offset On on the block table Tb are dummy or real.

In case the identifier indicates that the corresponding data block is a real one, the block number Bn is acquired from the space corresponding to the file offset On on the block table lb and is notified to the data read-out means 70. Receiving the block number Bn, the data read-out means 70 reads out the object data from the space indicated by the block number Bn on the storage device 900 and forwards the same to the file read-out means 50.

If the block identifier lb on the block table Tb shows that the corresponding data block is a dummy block, this information is given to the data read-out means 70. Thus informed that no data block to read exists, the data read-out means 70 prepares dummy data having a specific data pattern and forwards this dummy data to the file read-out means 50 as if the data had been read out from the storage device 900.

As set forth above, the present embodiment is so configured that in case a dummy block region is created in data writing in the file, no dummy data will be additionally written, yet dummy data can be prepared and forwarded in the read-out step. In addition, since data blocks are already allocated in the dummy block region in practice, it can be ensured that data blocks will be left unoccupied and available without fail for the later writing of real data in this block region.

EMBODIMENT 4

Figure 9:
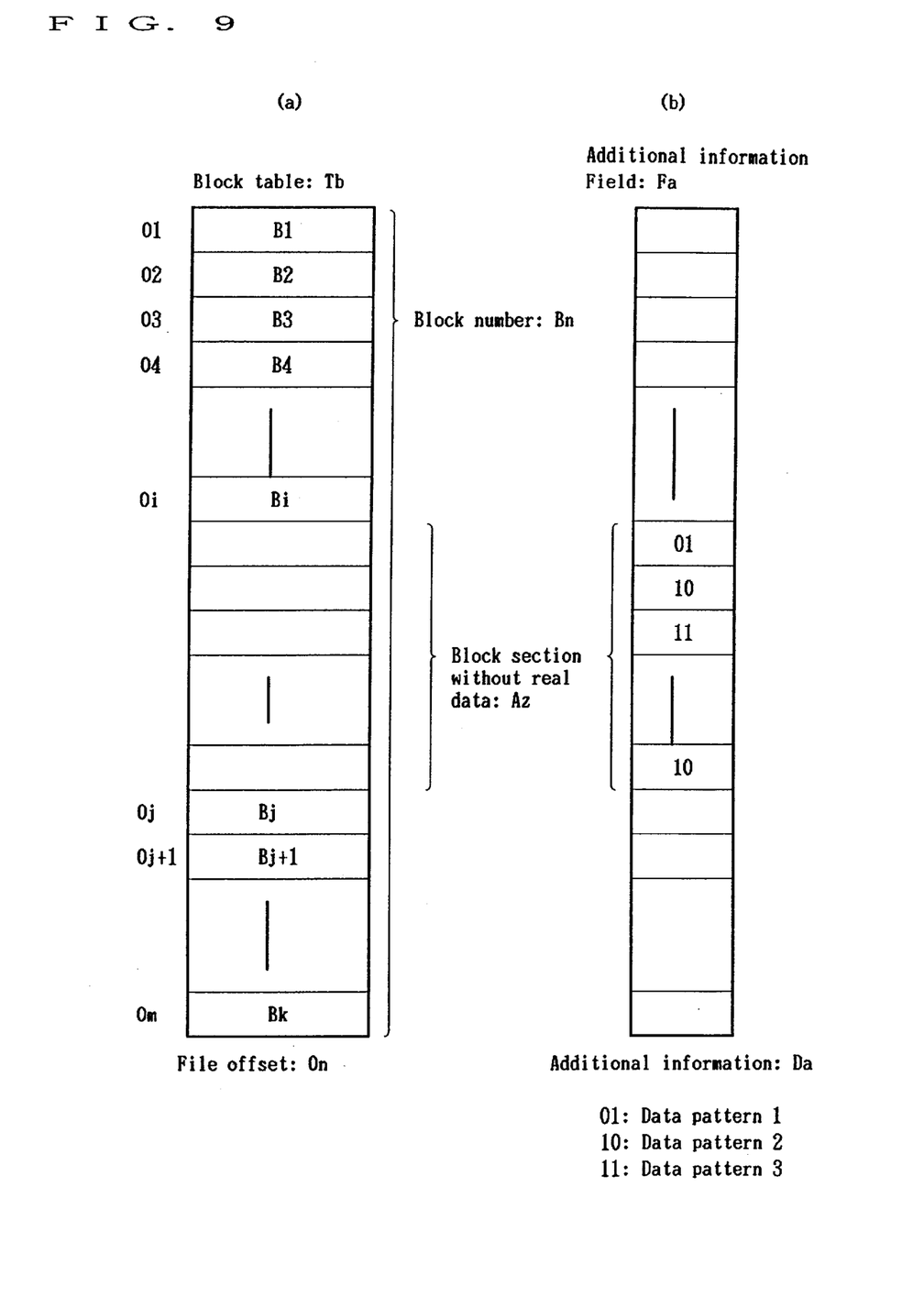
FIG. 9 is a conceptional diagram showing the block table having additional information used in the present invention.

In the foregoing three embodiments, the data read-out means 70 prepares dummy data in case data is read out from blocks in the dummy block region. If the block table Tb (FIG. 9(a)) is provided with an additional information field Fa with which additional information Da as shown in FIG. 9(b) is registered indicating which of the data patterns to take as in the aforesaid embodiments, it is possible to read out dummy data having any data pattern. It is noted that in FIG. 9(b), "01" corresponds to a full bit 1 and "11" to a full bit @, for example.

The additional information Da can be provided in every file. That makes it possible to read out dummy data with different data patterns per file. Also, the additional information Da can be provided on every block in the dummy block region. That can produce dummy data with different data patterns for each block. Different methods of inputting additional information are conceivable. They include one in which a plurality of default numbers are provided in the data block allocation means 30 so as to be automatically written at a specific place in the additional information field Fa for every dummy block or file, and another in which the operator reads out the block table Tb as necessary and manually writes at a specific place in the additional information field Fa on the block table Tb.

EMBODIMENT 5

Figure 10:
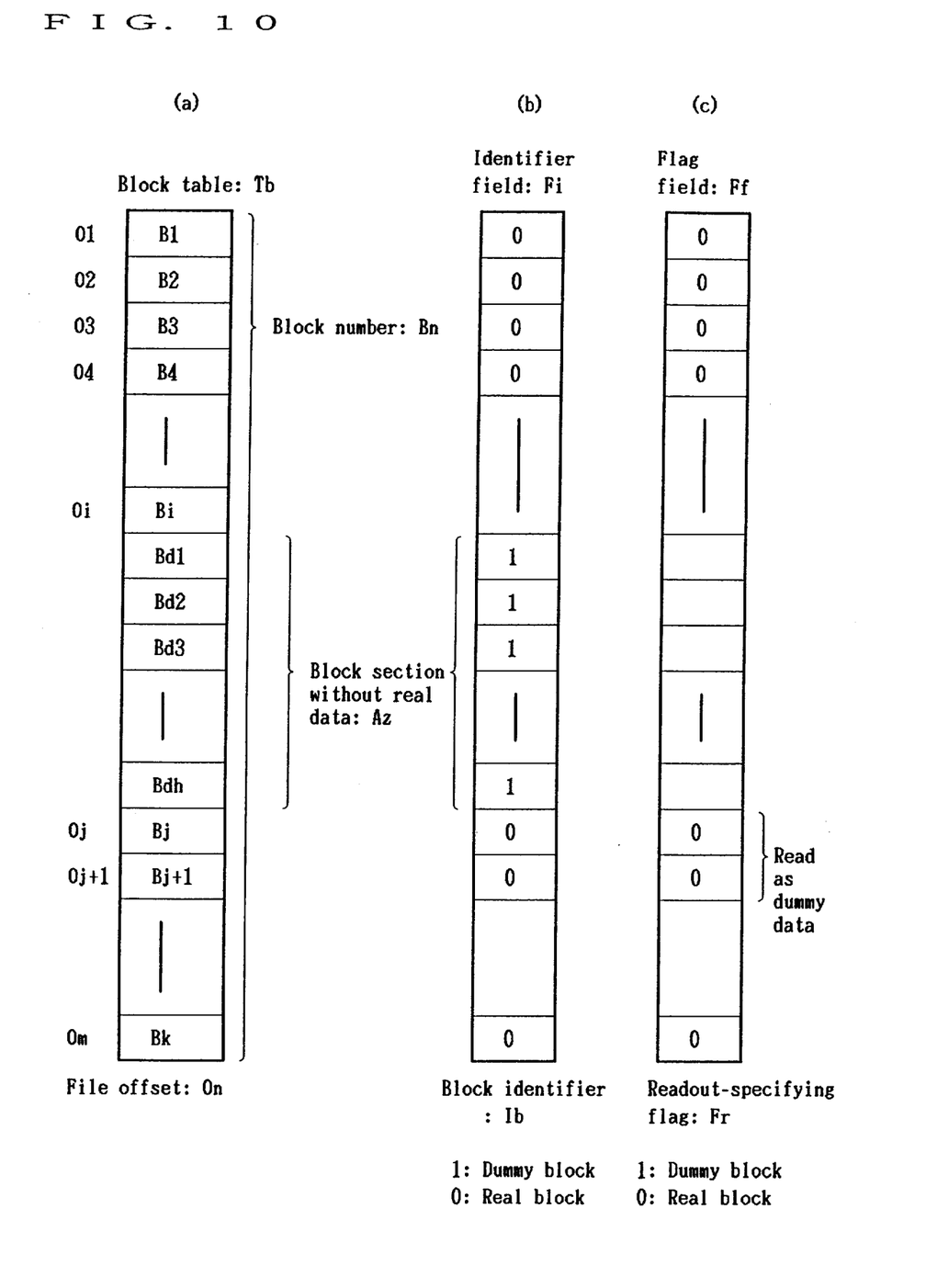
FIG. 10 is a conceptional diagram showing the block table having a block identifier and a readout-specifying flag in the fifth embodiment according to the present invention

FIG. 10 is a conceptional diagram showing the block tables used in another embodiment of the present invention.

The present embodiment is configured this way: the block table Tb as described above is provided with an identifier field Fi (FIG. 10(b)) corresponding to the block table Tb as shown in FIG. 10(a) in which a block identifier lb is registered for every block indicating whether the block is dummy. Furthermore, there is provided a flag field Ff as shown in FIG. 10(c) in which a readout-specifying flag Fr is registered that indicates block by block whether to read out real data as real or to read out real data as dummy from the storage device 900 when the block is a real one.

Under this arrangement, it is possible to load the following information on the aforesaid readout-specifying flag by the order from outside when data blocks are allocated at specified offset for the first time in writing real data in a file: information indicating whether the data in the block is to be read out as real data or as dummy data from the storage device 900 in reading out data from the data blocks.

That is, in reading out file date, the file read-out means 50 informs the block take-out means 60 of the file offset On for the data specified for read-out from outside, a user terminal, for example. The block take-out means 60 reads out the block table Tb stored on the storage device 900 and searches the identifier field Fi for the block identifier Ib corresponding to the given file offset On on the block table Tb.

In case the block identifier Ib indicates that the corresponding data block is a real one, the block take-out means 60 further searches the flag field PF for the corresponding readout-specifying flag and judges whether to read out the block as real data or dummy block.

In reading out the block, the block take-out means 60 informs the data read-out means 70 of the block number in case the block is read out as real data, and information as dummy block in case the block is read out as dummy block. In case the corresponding block identifier lb on the block table indicates a dummy block, too, this information is conveyed to the data read-out means 70.

Informed that no data block to read out exists or the case is treated as dummy block, the data read-out means 70 prepares dummy data with a specific data pattern and forwards this dummy data to the file read-out means 50 as if the data had been read out from the storage device 900.

Thus, data having a specific data pattern can be read out without destroying data on the real block. This can be done on a block-by-block basis. Therefore, it can be chosen as necessary which data to read out, real or dummy.

Dummy data having any particular data pattern can be freely read out if the additional information field Fa as shown in FIG. 9 is provided with additional information Da indicating what data pattern to use when the data read-out means prepares dummy data (on the basis of the flag in the flag field or block identifier). The additional information Da can be provided on every file or every block. Different ways of inputting readout-specifying flag are conceivable. Among them is one in which the operator reads out the block table Tb as necessary and manually writes in the flag field Ff on the said block table Tb.

As set forth, dummy data is not written in the dummy block region in data writing according to the present invention. That eliminates wasteful spending of time for writing, and secures data blocks to be allocated in that block region. It is guaranteed that when real data is written in that block region later, the required unoccupied blocks will be available and be acquired. In reading out dummy data, furthermore, any data pattern can be read out when dummy data is read out. This is applicable to every file or block.

It is to be understood that the various means or functions described in the embodiments of the present invention may be formed or configured as either software or hardware. Among such software are both a program to be incorporated into a memory means built in such devices as hard disk and a program incorporated in a portable medium.

What is claimed is:

1. A file management system, comprising dividing the storage area on the storage device into data blocks in a specific unit size, having the data block numbers and the file offset addresses paired and registered on a block table, said file offset addresses written on the said data blocks, and managing unoccupied blocks by a unoccupied block management means so that a data block allocation means takes the writing step by referring to said block table when directed to write, characterized in that:

said data block allocation means is provided with a function of calculating the number of dummy blocks without real data when there is a request to write, the starting point of writing a new data being at an offset address one or more blocks apart from the last offset address of a specific file, and said unoccupied block management means is provided with a function of managing as number of unoccupied blocks the number obtained by subtracting the number of said dummy blocks from the number of unoccupied data blocks.

2. The file management system as defined in claim 1, which is further provided with:

a dummy block management means for picking out from the unoccupied block management means the block numbers of the number of dummy blocks calculated by said data block allocation means and managing the same, and a dummy block allocation means for allocating the dummy blocks managed by said dummy block management means for data to write when there is a request to write in a dummy block region where at least one said dummy block exists.

3. The file management system as defined in claim 2, wherein said dummy block management means manages said block numbers and the corresponding file identifiers and when there is a request to write in said dummy block region, the dummy block allocation means allocates blocks by referring to said file identifiers.

4. The file management system as defined in claim 1, which is provided with a dummy block registration means for picking out from the unoccupied block management means the block numbers of the dummy blocks in the number calculated by said data block allocation means, registering the block numbers of said dummy blocks at the file offset addresses corresponding to said dummy blocks on the block table, and additionally providing a block identifier indicating that no real data is present in said blocks.

5. A file management method, comprising dividing the storage area on the storage device into data blocks in a specific unit size, having the data block numbers and the file offset addresses paired and registered on a block table, said file offset addresses written on the said data blocks, and managing unoccupied blocks by the unoccupied block management means so that a data block allocation means takes the writing step by referring to said block table when directed to write, characterized in that:

when there is a request to write, the starting point of writing a new data being at an offset address one or more blocks apart from the last offset address of a specific file, said unoccupied block management means manages as number of unoccupied blocks the number obtained by subtracting the number of said dummy blocks without real data from the number of unoccupied data blocks.

6. The file management method as defined in claim 5, wherein said dummy block numbers are managed by the dummy block management means and when there is a request to write in said dummy block region, the dummy block allocation means allocates for data to write the dummy blocks managed by said dummy block management means.

7. The file management method as defined in claim 6, wherein said dummy block management means manages both the said block numbers and the corresponding file identifiers, and when there is a request to write in said dummy block region, the dummy block allocation means allocates blocks by referring to said file identifiers.

8. The file management method as defined in claim 5, wherein said dummy block numbers are written at the corresponding file offset addresses on said block table and are managed by adding data identifiers to the respective data blocks indicating that the blocks are dummy.

9. The file management method as defined in claim 6, 7 or 8, wherein the data read-out means reads out data by referring to said block table when an order to read out are issued, characterized in that said data read-out means has additional information to read out a specific data pattern as dummy data in reading out said dummy block region of the file.

10. The file management method as defined in claim 6, wherein the data read-out means reads out data by referring to said block table when an order to read out is issued, characterized in that every file has additional information to read out a specific data pattern as dummy data when said data read-out means reads out said dummy block region of the file.

11. The file management method as defined in claim 6, 7 or 8, wherein the data read-out means reads out data by referring to said block table when an order to read out is issued, characterized in that the respective blocks on said block table have additional information to read out a specific data pattern as dummy data when said data read-out means reads out said dummy block region without real data of the file.

12. The file management method as defined in claim 8, wherein the data read-out means reads out data by referring to said block table when an order to read out is issued, characterized in that every block registered on said block table has a readout-specifying flag indicating whether to read out real data or read out this block as dummy block from said storage device in case said block is a real one with real data, and additional information is provided to read out a specific pattern as dummy data in case said block identifier indicates that the block to read is a dummy or in case real data is read out as dummy data as indicated by said readout-specifying flag.

13. The file management method as defined in claim 8, wherein the data read-out means reads out data by referring to said block table when an order to read out is issued, characterized in that every block registered on said block table has a readout-specifying flag indicating whether to read out real data or read out this block as dummy block from said storage device in case said block is a real one with real data, and every file has additional information provided to read out a specific pattern as dummy data in case said block identifier indicates that the block to read is a dummy or in case real data is read out as dummy data as indicated by said readout-specifying flag.

14. The file management method as defined in claim 8, wherein the data read-out means reads out data by referring to said block table when an order to read-out is issued, characterized in that every block registered on said block table has a readout-specifying flag indicating whether to read out real data or read-out this block as dummy block from said storage device in case said block is a real one with real data, and every block has additional information provided to read out a specific pattern as dummy data in case said block identifier indicates that the block to read is a dummy or in case real data is read out as dummy data as indicated by said readout-specifying flag.

15. A storage medium which has a file managing procedure stored therein comprising dividing the memory space on the storage device into data blocks in a specific unit size, having the data block numbers and the file offset addresses paired and registered on a block table, said file offset addresses written on the said data blocks, and managing unoccupied blocks so as to take the writing step by referring to said block table when directed to write, characterized in that there is stored a procedure of managing as number of unoccupied blocks the number obtained by subtracting the number of said dummy blocks without real data from the number of unoccupied data blocks at said unoccupied block management means when there is a request to write, the starting point of writing a new data being at an offset address one or more blocks apart from the last offset address of a specific file.

16. The storage medium as defined in claim 15, wherein said dummy block numbers are managed by the dummy block management means and which has stored a procedure of allocating said managed dummy blocks for data to write when there is a request to write in said dummy block region.

17. The storage medium as defined in claim 16, wherein said dummy blocks are managed by said block numbers and the corresponding file identifiers and which has stored a procedure of the dummy block allocation means allocating blocks by referring to said file identifiers when there is a request to write in said dummy block region.

18. The storage medium as defined in claim 15, which has stored a procedure of managing by writing said dummy block numbers at the corresponding file offset addresses on said block table and adding a data identifier to every data block indicating that the block is a dummy.

* * * * *